US008606885B2

(12) United States Patent
Sunder et al.

(10) Patent No.: US 8,606,885 B2
(45) Date of Patent: Dec. 10, 2013

(54) METHOD AND SYSTEM OF PROVIDING ACCESS POINT DATA ASSOCIATED WITH A NETWORK ACCESS POINT

(75) Inventors: Singam Sunder, San Jose, CA (US); Jeff Steven Edgett, Sunnyvale, CA (US); Roy David Albert, San Jose, CA (US)

(73) Assignee: iPass Inc., Redwood Shores, CA (US)

( * ) Notice: Subject to any disclaimer, the term of this patent is extended or adjusted under 35 U.S.C. 154(b) by 2200 days.

(21) Appl. No.: 10/456,736

(22) Filed: Jun. 5, 2003

(65) Prior Publication Data

US 2005/0021781 A1 Jan. 27, 2005

(51) Int. Cl.
*G06F 15/16* (2006.01)

(52) U.S. Cl.
USPC .......................................... 709/220; 709/217

(58) Field of Classification Search
USPC .......................................... 709/229, 227, 220
See application file for complete search history.

(56) References Cited

U.S. PATENT DOCUMENTS

| | | | |
|---|---|---|---|
| 5,202,921 A | 4/1993 | Herzberg et al. | |
| 5,331,574 A | 7/1994 | Temoshenko et al. | |
| 5,369,705 A | 11/1994 | Bird et al. | |
| 5,412,723 A | 5/1995 | Canetti et al. | |
| 5,446,680 A | 8/1995 | Sekiya et al. | |
| 5,497,421 A | 3/1996 | Kaufman et al. | |
| 5,521,949 A | 5/1996 | Huang et al. | |
| 5,560,008 A * | 9/1996 | Johnson et al. ............... | 709/229 |
| 5,564,017 A | 10/1996 | Corn et al. | |
| 5,606,663 A | 2/1997 | Kadooka | |
| 5,611,048 A | 3/1997 | Jacobs et al. | |
| 5,638,514 A | 6/1997 | Yoshida et al. | |
| 5,726,883 A | 3/1998 | Levine et al. | |
| 5,781,189 A | 7/1998 | Holleran et al. | |
| 5,793,952 A | 8/1998 | Limsico | |
| 5,799,084 A | 8/1998 | Gallagher et al. | |
| 5,802,592 A | 9/1998 | Chess et al. | |
| 5,815,665 A | 9/1998 | Teper et al. | |
| 5,832,228 A | 11/1998 | Holden et al. | |
| 5,845,267 A | 12/1998 | Ronen | |
| 5,852,812 A | 12/1998 | Reeder | |
| 5,892,900 A | 4/1999 | Ginter et al. | |

(Continued)

FOREIGN PATENT DOCUMENTS

| | | |
|---|---|---|
| JP | 02033648 | 2/1990 |
| JP | 02039260 | 2/1990 |

(Continued)

OTHER PUBLICATIONS

"About Fiberlink", Published by Fiberlink Communications Corp.,(2001),1 pg.

(Continued)

*Primary Examiner* — Kevin Bates
(74) *Attorney, Agent, or Firm* — DeLizio Gilliam, PLLC

(57) ABSTRACT

A method includes sending a faked authentication request from a client device wherein the faked authentication request includes identification credentials. A faked authentication request indicates that a reply message in response to the faked authentication request is to include data for updating a directory on the client device. A reply message is received at the client device in response to the faked authentication request. The reply message includes data for updating the directory. The directory is updated based, at least in part, on the data for updating the directory.

10 Claims, 8 Drawing Sheets

(56) References Cited

U.S. PATENT DOCUMENTS

| | | | |
|---|---|---|---|
| 5,923,756 A | 7/1999 | Shambroom | |
| 5,953,422 A | 9/1999 | Angelo et al. | |
| 5,991,292 A | 11/1999 | Focsaneanu et al. | |
| 6,023,470 A | 2/2000 | Lee et al. | |
| 6,023,502 A | 2/2000 | Bouanaka et al. | |
| 6,026,375 A | 2/2000 | Hall et al. | |
| 6,028,917 A | 2/2000 | Creamer et al. | |
| 6,029,143 A | 2/2000 | Mosher et al. | |
| 6,032,132 A | 2/2000 | Nelson | |
| 6,032,137 A | 2/2000 | Ballard | |
| 6,035,281 A | 3/2000 | Crosskey et al. | |
| 6,047,051 A | 4/2000 | Ginzboorg et al. | |
| 6,049,671 A | 4/2000 | Slivka et al. | |
| 6,055,503 A | 4/2000 | Horstmann | |
| 6,064,736 A | 5/2000 | Davis et al. | |
| 6,078,906 A | 6/2000 | Huberman | |
| 6,094,721 A | 7/2000 | Eldridge et al. | |
| 6,112,239 A | 8/2000 | Kenner | |
| 6,125,354 A | 9/2000 | MacFarlane et al. | |
| 6,128,601 A | 10/2000 | Van Horne et al. | |
| 6,141,756 A | 10/2000 | Bright et al. | |
| 6,157,618 A | 12/2000 | Boss et al. | |
| 6,167,126 A | 12/2000 | Janning | |
| 6,175,869 B1 | 1/2001 | Ahuja et al. | |
| 6,182,229 B1 | 1/2001 | Nielsen | |
| 6,188,994 B1 | 2/2001 | Egendorf | |
| 6,189,096 B1 | 2/2001 | Haverty | |
| 6,198,824 B1 | 3/2001 | Shambroom | |
| 6,208,977 B1 | 3/2001 | Hernandez et al. | |
| 6,212,280 B1 | 4/2001 | Howard, Jr. et al. | |
| 6,212,561 B1 | 4/2001 | Sitaraman et al. | |
| 6,216,117 B1 | 4/2001 | Hall | |
| 6,219,790 B1 | 4/2001 | Lloyd et al. | |
| 6,233,446 B1 | 5/2001 | Do | |
| 6,240,091 B1 | 5/2001 | Ginzboorg et al. | |
| 6,253,327 B1 | 6/2001 | Zhang et al. | |
| 6,260,142 B1 | 7/2001 | Thakkar et al. | |
| 6,269,401 B1 | 7/2001 | Fletcher et al. | |
| 6,298,234 B1 | 10/2001 | Brunner | |
| 6,307,837 B1 | 10/2001 | Ichikawa et al. | |
| 6,317,792 B1 | 11/2001 | Mundy et al. | |
| 6,324,579 B1 | 11/2001 | Bleuse et al. | |
| 6,327,707 B1 | 12/2001 | McKeeth et al. | |
| 6,330,443 B1 | 12/2001 | Kirby | |
| 6,338,140 B1 | 1/2002 | Owens et al. | |
| 6,401,211 B1 | 6/2002 | Brezak, Jr. et al. | |
| 6,405,028 B1 | 6/2002 | DePaola et al. | |
| 6,446,207 B1 | 9/2002 | Vanstone et al. | |
| 6,449,722 B1 | 9/2002 | West et al. | |
| 6,463,534 B1 | 10/2002 | Geiger et al. | |
| 6,466,964 B1 | 10/2002 | Leung et al. | |
| 6,510,463 B1 | 1/2003 | Farhat et al. | |
| 6,513,060 B1 | 1/2003 | Nixon et al. | |
| 6,522,884 B2 | 2/2003 | Tennison et al. | |
| 6,539,482 B1 | 3/2003 | Blanco et al. | |
| 6,546,492 B1 | 4/2003 | Walker et al. | |
| 6,549,770 B1 | 4/2003 | Marran | |
| 6,571,095 B1 | 5/2003 | Koodli | |
| 6,577,858 B1 | 6/2003 | Gell | |
| 6,578,075 B1 | 6/2003 | Nieminen et al. | |
| 6,628,775 B1 | 9/2003 | Van Tol | |
| 6,640,242 B1 | 10/2003 | O'Neal et al. | |
| 6,687,560 B2 | 2/2004 | Kiser et al. | |
| 6,725,310 B2 | 4/2004 | Shoobe et al. | |
| 6,732,270 B1 | 5/2004 | Patzer et al. | |
| 6,748,439 B1 | 6/2004 | Monachello et al. | |
| 6,753,887 B2 | 6/2004 | Carolan et al. | |
| 6,785,823 B1 | 8/2004 | Abrol et al. | |
| 6,792,464 B2 | 9/2004 | Hendrick | |
| 6,839,320 B2 | 1/2005 | Paridaens et al. | |
| 6,851,062 B2 | 2/2005 | Hartmann et al. | |
| 6,925,182 B1 | 8/2005 | Epstein | |
| 6,947,992 B1 | 9/2005 | Shachor | |
| 6,952,768 B2 | 10/2005 | Wray | |
| 7,020,645 B2 | 3/2006 | Bisbee et al. | |
| 7,031,705 B2 | 4/2006 | Grootwassink | |
| 7,203,838 B1 | 4/2007 | Glazer et al. | |
| 7,224,677 B2 * | 5/2007 | Krishnamurthi et al. | 370/331 |
| 7,469,341 B2 | 12/2008 | Edgett et al. | |
| 7,483,984 B1 * | 1/2009 | Jonker et al. | 709/226 |
| 7,590,708 B2 * | 9/2009 | Hsu | 709/218 |
| 7,778,606 B2 * | 8/2010 | Ammon et al. | 455/67.11 |
| 8,045,530 B2 * | 10/2011 | Haverinen et al. | 370/338 |
| 2001/0021915 A1 | 9/2001 | Cohen et al. | |
| 2001/0034677 A1 | 10/2001 | Farhat et al. | |
| 2001/0034693 A1 | 10/2001 | Farhat et al. | |
| 2001/0034704 A1 | 10/2001 | Farhat et al. | |
| 2001/0044893 A1 | 11/2001 | Skemer | |
| 2001/0044900 A1 | 11/2001 | Uchida | |
| 2002/0029275 A1 | 3/2002 | Selgas et al. | |
| 2002/0083009 A1 | 6/2002 | Lansing et al. | |
| 2002/0114346 A1 | 8/2002 | Lampe et al. | |
| 2002/0144108 A1 | 10/2002 | Benantar | |
| 2003/0039237 A1 | 2/2003 | Forslow | |
| 2003/0079143 A1 | 4/2003 | Mikel et al. | |
| 2003/0131264 A1 | 7/2003 | Huff et al. | |
| 2003/0158960 A1 * | 8/2003 | Engberg | 709/228 |
| 2003/0177389 A1 | 9/2003 | Albert et al. | |
| 2003/0186681 A1 * | 10/2003 | Gabor | 455/411 |
| 2004/0078284 A1 | 4/2004 | Musgrove et al. | |
| 2004/0181602 A1 * | 9/2004 | Fink | 709/229 |
| 2005/0055371 A1 | 3/2005 | Sunder et al. | |
| 2005/0091075 A1 | 4/2005 | Cohen et al. | |
| 2005/0228874 A1 | 10/2005 | Edgett et al. | |

FOREIGN PATENT DOCUMENTS

| | | |
|---|---|---|
| JP | 02112053 | 4/1990 |
| JP | 03189852 | 8/1991 |
| JP | 04054661 | 2/1992 |
| JP | 04067252 | 3/1992 |
| JP | 04084254 | 3/1992 |
| JP | 04142655 | 5/1992 |
| JP | 05189288 | 7/1993 |
| JP | 05199327 | 8/1993 |
| JP | 07182064 | 7/1995 |
| JP | 08314835 | 11/1996 |
| JP | 09265455 | 10/1997 |
| JP | 09330298 | 12/1997 |
| JP | 10-215284 | 8/1998 |
| JP | 10289209 | 10/1998 |
| JP | 11-168459 | 6/1999 |
| JP | 11203247 | 7/1999 |
| JP | 11284666 | 10/1999 |
| JP | 11-313055 | 11/1999 |
| JP | 00112892 | 4/2000 |
| JP | 2000101640 | 4/2000 |
| JP | 00151754 | 5/2000 |
| JP | 00165839 | 6/2000 |
| JP | 00194657 | 7/2000 |
| JP | 00259276 | 9/2000 |
| JP | 01053910 | 2/2001 |
| WO | WO-97/15885 | 5/1997 |
| WO | WO-0019297 | 4/2000 |
| WO | WO-0035151 A1 | 6/2000 |
| WO | WO-0062514 | 10/2000 |
| WO | WO-0103398 A2 | 1/2001 |
| WO | WO-2004109535 A1 | 12/2004 |
| WO | WO-2005104425 A3 | 11/2005 |

OTHER PUBLICATIONS

"Broadmedia Introduces G-Phone DLX Phone (Product Annoucement)", *Tele-Service News*, 12(6), (Jun. 1, 2000),2 pgs.

"Dial Up With Bay's New Remote Access Concentrator", *IT Times*, (Oct. 21, 1997),p. 6.

"EarthLink Dials Up ClientLogic for Multi-Channel Technical Support", *Business Wire*, (Jul. 24, 2001),2 pgs.

"International Search Report for PCT Applicatiion No. PCT/US01/05752",(May 9, 2001).

"International Search Report for PCT Application No. PCT/US01/05724", (Jun. 8, 2001).

(56) References Cited

OTHER PUBLICATIONS

"IP Axess Adds Fixed-Wireless Service Provider to Participants in Its Expanding Evaluation Program", *Business Wire*, (Apr. 4, 2001),2 pgs.

"Lucent Technologies Launches Next-Generation Voice Dialing Service for Wireless Networks. (Brief Article).", *Cambridge Telcom Report*, (Mar. 27, 2000),2 pgs.

"Netopia Introduces First ADSL Routers to Offer Integrated Backup Module for "Fast Track" Deployment and Fully Redundant Internet Connectivity", *Business Wire*, (May 24, 2000),5 pgs.

"Trinagy's New Insight for Dial Access Solution Suite Delivers Proactive Management of Dial-Up Service Offerings", *Business Wire*, (Apr. 24, 2001),2 pgs.

"Ubrandit.com Adds Gigitel and Zodiac Cafe to Virtual ISP Client List", *Business Wire*, (Oct. 16, 2000),2 pgs.

Barron, G., "Written Opinion for PCT Application No. PCT/US02/12343",(Mar. 6, 2003).

Edwards, Morris, "It's a VPN thing—Technology Information", *Communications News*, (Aug. 1, 1999),4 pgs.

Schneier, Bruce, "In: Applied Cryptography: protocols, algorithms, and source code in C", *New York : Wiley, 2nd Edition*, (1996),31-34, 52-56, 60, 75-79, 256, 480-481.

West, Wray, "Don't be nervous—remote access VPN's—Industry Trend or Event", *Communication News*, 37(5), (May 2000),28, 30, 32.

Kang, Paul H., "PCT Search Report".

Aboba, B., et al., "The Network Access Identifier", *RFC2486*, (Jan. 1999),1-5.

Barron, Gilberto, "International Search Report", PCT/US02/25996.

Barron, Gilberto, "Written Opinion", PCT/US02/12343.

Blache, Fabian III, "Spicing up the Web", *Greater Baton Rouge Business Report*, ISSN-0747-4652,(Jul. 18, 2000),v18n23 pp. 94.

Blass, Steve, "Dr. Internet", *Network World*, ISSN-0887-7661,(Mar. 11, 2002),55.

Brockmann, Peter, "Rapport dialup switch redefines Internet service opportunities", *Telesis*, ISSN-0040-2710,(Dec. 1996),n102 pp. 12-13.

Bruno, Lee, "Software & security. (Netegrity's Siteminder Enterprise Security software) (Product Information)", *Data Communications*, ISSN-0363-6399,(Jan. 1997),84(3) page(d).

Callahan, Paul, "International Search Report", PCT/US02/12343.

Clyde, Robert A., "Try a step-by-step approach. (data security measures)", *Computing Canada*, ISNN-0319-0161,(Jan. 4, 1995),42(1) page(s).

Edwards, Morris, "It's a VPN thing. (Technology Information)", *Communications News*, ISSN-0010-3632,(Aug. 1, 1999),vol. 36, No. 8, pp. 94.

Greene, Tim, "Upstart VPN services staking out new ground", *Network World*, ISSN-0887-7661,(Apr. 16, 2001),v18n16 pp. 30.

Guy, Sandra, "Untangling phone frustration, Bellcore solution offers a simpler way to do business", *Telephony*, ISSN-0040-2656,(Jun. 2, 1997).

Harrell, Robert B., "International Search Report", PCT/US01/41540.

Johnson, Johna T., "Linking corporate users to the Internet", *Data Communications*, ISSN-0363-6399,(Jan. 1993),v22n1 pp. 56-58.

Likier, Marty, "Using-Dial-Up Technology for Internetworking Applications", *Telecommunications*, ISSN-0278-4831,(May 1992),v26n5 pp. 52,54.

Malinowski, Walter, "International Search Report", PCT/US01/05752.

Millin, Vincent, "International Search Report", PCT/US01/05724.

No-Author, "Broadmedia Introduces G-Phone DLX IP Phone. (Product Announcement)", *Tele-Service News*, (Jun. 1, 2000),vol. 12, No. 6, pp. NA No-Author, "Companies mix and match VPN, dial-access support", *InternetWeek*, ISSN-0746-8121,(Jan. 25, 1999),n749 pVPN20.

No-Author, "Dial Up with Bay's new Remote Access Concentrator", *IT Times*, (Oct. 21, 1997),p. 6.

No-Author, "EarthLink Dials Up ClientLogic for Multi-Channel Technical Support", *Business Wire*, (Jul. 24, 2001),2226.

No-Author, "IP Axess Adds Fixed-Wireless Service Provider to Participants in Its Expanding Evaluation Program", *Business Wire*, (Apr. 4, 2001),2225.

No-Author, "Lucent Technologies Launches Next-Generation Voice Dialing Service for Wireless Networks.(Brief Article)", *Cambridge Telecom Report*, (Mar. 27, 2000),NA.

No-Author, "Netopia Introduces First ADSL Routers to Offer Integrated Backup Module for "Fast Track" Deployment and Fully Redundant Internet Connectivity", *Business Wire*, (May 24, 2000),0514.

No-Author, "Trinagy's New Insight for Dial Access Solution Suite Delivers Proactive Management of Dial-Up Service Offerings", *Business Wire*, (Apr. 24, 2001),2448.

No-Author, "Ubrandit.com Adds Gigitel and Zodiac Cafe to Virtual ISP Client List", *Business Wire*, (Oct. 16, 2000),0709.

Peeso, Thomas R., "International Search Report", PCT/US02/12475.

Salamone, Salvatore, "Simplified Roaming, From POP to POP", *InternetWeek*, ISSN-1096-9969, (Feb. 15, 1999),n752 pp. 11.

Sanders, Bob, "Despite nasty shake-out local ISPs are thriving", *New Hampshire Business Review*, ISSN-0164-8152,(Feb. 23, 2001),v23n4 pp. 1.

Scarcia, Costantino, "Getting on the Net With the Right ISP", *New Jersey Business*, ISSN-0028-5560,(Sep. 1, 2000),v46n9 pp. 40.

Schneier, B., "Applied Cryptography Second Edition", *John Wiley and Sons*, (Oct. 1995),31-34, 52-56, 60, 75-79, 256, 480-481.

Semich, J. W., "56K server supports U.S. Robotics and Lucent—Modems built into Model 8000 from Bay Networks", ISSN-1081-3071, ISSN-1081-3071,(Aug. 18, 1997),v3 n26 p. 25.

Shen, Jin, et al., "Research and implementation of proxy server", *Journal of Nanjing University of Aeronautics & Astronautics*, ISSN-1005-2615,(Dec. 2000),vol. 32 No. 6 pp. 620-624.

Silberg, Lurie, "Dialing the Web AT&T's Internet Cellphone Debuts At Mass; Launches PocketNet wireless data service at retail in an attempt to bring cellphone with Internet access to the masses", *HFN the Weekly Newspaper for the Home Furnishing Network*, (Oct. 13, 1997),93.

Smithers, Matthew, "International Search Report", PCT/US02/12470.

Trammell, James, "International Search Report", PCT/US01/05723.

West, W., "Don't be nervous Y remote access VPNs", *Communications News*, ISSN-0010-3632,(May 2000),vol. 37, No. 5 pp. 28, 30, 32.

"U.S. Appl. No. 10/117,868 Final Office Action mailed Jul. 25, 2006", 25 pgs.

"U.S. Appl. No. 10/117,868 Final Office Action Mailed Sep. 4, 2007", 26 pgs.

"U.S. Appl. No. 10/117,868 Non Final Office Action mailed Mar. 14, 2007", 27 pgs.

"U.S. Appl. No. 10/117,868 Non Final Office Action mailed Dec. 9, 2005", 46 pgs.

"U.S. Appl. No. 10/117,868 Response filed Mar. 1, 2006 to Non Final Office Action mailed Dec. 9, 2005", 17 pgs.

"U.S. Appl. No. 10/117,868 Response filed Jun. 13, 2007 to Non Final Office Action mailed Mar. 14, 2007", 20 pgs.

"U.S. Appl. No. 10/117,868 Response filed Dec. 20, 2006 to Final Office Action mailed Jul. 25, 2006", 17 pgs.

"U.S. Appl. No. 10/118,380 Non Final Office Action mailed Dec. 14, 2005", 31 pgs.

"U.S. Appl. No. 10/118,380 Response filed Mar. 13, 2006 to Non Final Office Action mailed Dec. 14, 2005", 18 pgs.

"U.S. Appl. No. 10/118,406 Final Office Action mailed Jul. 24, 2007", 13 pgs.

"U.S. Appl. No. 10/118,406 Final Office Action mailed Aug. 16, 2006", 12 pgs.

"U.S. Appl. No. 10/118,406 Non Final Office Action mailed Feb. 28, 2006", 31 pgs.

"U.S. Appl. No. 10/118,406 Non Final Office Action mailed Mar. 8, 2007", 11 pgs.

"U.S. Appl. No. 10/118,406 Response filed Jun. 5, 2006 to Non Final Office Action mailed Feb. 28, 2006", 13 pgs.

"U.S. Appl. No. 10/118,406 Response filed Jun. 15, 2007 to Non Final Office Action mailed Mar. 8, 2007", 7 pgs.

(56) References Cited

OTHER PUBLICATIONS

"U.S. Appl. No. 10/118,406 Response filed Dec. 8, 2006 to Final Office Action mailed Aug. 16, 2006", 13 pgs.

"U.S. Appl. No. 10/821,313 Final Office Action mailed Jun. 20, 2007", 17 pgs.

"U.S. Appl. No. 10/821,313 Final Office Action mailed Jun. 21, 2006", 14 pgs.

"U.S. Appl. No. 10/821,313 Non Final Office Action mailed Jan. 19, 2006", 13 pgs.

"U.S. Appl. No. 10/821,313 Non Final Office Action mailed Mar. 1, 2007", 17 pgs.

"U.S. Appl. No. 10/821,313 Response filed May 22, 2007 to Non Final Office Action mailed Mar. 1, 2007", 14 pgs.

"U.S. Appl. No. 10/821,313 Response filed Dec. 18, 2006 to Final Office Action mailed Jun. 21, 2006", 14 pgs.

"U.S. Appl. No. 10/821,313, Response filed May 18, 2006 to Non Final Office Action mailed Jan. 19, 2006", 12 pgs.

"U.S. Appl. No. 10/118,406, Response filed to Final Office Action mailed Jul. 24, 2007", 15 pgs.

"Japanese Patent Application No. 2002-584172, Notice of the Reason for Refusal mailed Jul. 10, 2007", (with English Translation), 24 pgs.

"U.S. Appl. No. 10/117,868, Response filed Oct. 31, 2007 to Final Office Action mailed Sep. 4, 2007", 22 pgs.

"U.S. Appl. No. 10/821,313, Response filed Oct. 22, 2007 to Final Office Action mailed Jun. 20, 2007", 16 pgs.

"U.S. Appl. No. 10/118,406, Non-Final Office Action mailed Nov. 19, 2007", OARN,13 pgs.

"U.S. Appl. No. 10/821,313 Non-Final Office Action mailed Dec. 28, 2007", OARN,17 pgs.

"U.S. Appl. No. 10/117,868, Response filed May 21, 2008 to Non Final Office Action mailed Feb. 21, 2008", 15 pgs.

"U.S. Appl. No. 10/117,868 Non-Final Office Action mailed Feb. 21, 2008", OARN,25 pgs.

"U.S. Appl. No. 10/118,406 Non-Final Office Action mailed Apr. 11, 2008", OARN,12 Pgs.

"U.S. Appl. No. 10/821,313 Response filed Apr. 29, 2008 to Non-Final Office action mailed Dec. 28, 2007", 14 pgs.

"U.S. Appl. No. 10/118,406, Response filed Feb. 22, 2008 to Non-Final Office Action mailed Nov. 19, 2007", 5 pgs.

"International Application Serial No. PCT/US02/12343, International Preliminary Examination Report mailed Jul. 8, 2003", 8 pgs.

"International Application Serial No. PCT/US03/17905, International Preliminary Examination Report mailed Mar. 29, 2006", 4 pgs.

"International Application Serial No. PCT/US03/17905, Response filed Jul. 1, 2005 to Written Opinion mailed May 23, 2005", 12 pgs.

"International Application Serial No. PCT/US03/17905, Written Opinion mailed May 23, 2005", 4 pgs.

"International Application Serial No. PCT/US04/34533, International Preliminary Report on Patentability mailed Nov. 8, 2006", 6 pgs.

"International Application Serial No. PCT/US04/34533, International Search Report mailed Jan. 31, 2006", 4 pgs.

"International Application Serial No. PCT/US04/34533, Written Opinion mailed Jan. 31, 2006", 6 pgs.

"Session Identification URI", *W3C Working Draft WD-session-id-960221*, http://web.archive.org/web/19970730054113/http:/Iwww.w3,orgITRIWD-session-id,(Jul. 30, 1997),pp. 1-10.

"U.S. Appl. No. 10/821,313 Final Office Action mailed on May 30, 2008", 16 Pages.

"International Application Serial No. 2002-584172, Notice of the Reason for Refusal mailed Jul. 5, 2007", 16 pgs.

"U.S. Appl. No. 10/118,380, Notice of Allowance mailed Jun. 12, 2008", 4 pgs.

"U.S. Appl. No. 10/118,406, Final Office Action mailed Aug. 28, 2008", 10 pgs.

"U.S. Appl. No. 10/118,406, Response filed Jul. 8, 2008 to Non Final Office Action mailed Apr. 11, 2008", 14 pgs.

"U.S. Appl. No. 10/456,736, Preliminary Amendment mailed Jul. 6, 2005", 9 pgs.

"U.S. Appl. No. 10/821,313, Notice of Allowance mailed Sep. 5, 2008", NOAR, 14 pgs.

"U.S. Appl. No. 10/832,424, Response filed Jul. 25, 2008 to Final Office Action mailed May 30, 2008", 15 pgs.

"U.S. Appl. No. 10/117,868, Examiner Interview Summary mailed Apr. 8, 2008", 2 pgs.

"U.S. Appl. No. 10/117,868, Non-Final Office Action mailed Sep. 17, 2008", 20 pgs.

"U.S. Appl. No. 10/117,868, Response filed Nov. 26, 2008 to Non-Final Office Action mailed Sep. 17, 2008", 16 pgs.

"U.S. Appl. No. 10/118,380, Notice of Allowance mailed Oct. 30, 2008", 11 pgs.

"U.S. Appl. No. 10/118,380, Preliminary Amendment filed Jun. 3, 2002", 2 pgs.

"U.S. Appl. No. 10/821,313, Examiner Interview Summary filed Jul. 25, 2008", 1 pg.

"U.S. Appl. No. 10/821,313, Examiner Interview Summary mailed Jun. 30, 2008", 2 pgs.

"U.S. Appl. No. 10/821,313, Examiner Interview Summary mailed Sep. 5, 2008", 7 pgs.

"U.S. Appl. No. 10/821,313, Notice of Allowance mailed on Dec. 5, 2008", 12 pgs.

"Japanese Application Serial No., Office Action mailed Feb. 13, 2007", 4 pgs.

\* cited by examiner

METHOD AND SYSTEM OF PROVIDING ACCESS POINT DATA ASSOCIATED WITH A NETWORK ACCESS POINT

FIELD OF THE INVENTION

The present invention relates generally to a method and system of providing access point data associated with a network access point. The invention extends to a machine-readable medium including a plurality of instructions that cause a computer to carry out the method.

BACKGROUND

So-called "wireless hotspots" are becoming increasingly popular for mobile workers to gain access to computer networks. These hotspots typically allow users to connect to the Internet via their laptops in hotels, airports and cafes in a wireless fashion. There are movements afoot to set up wireless networks just about everywhere you can imagine. These rapidly proliferating wireless nodes or wireless hotspots are typically 802.11b or the like compliant, and are emerging most large cities around the world.

In order to meet the needs of mobile customers, for example using wireless hotspots, Internet Service Providers (ISPs) have begun to offer local-call access to the Internet from various locations world wide, such a service being termed a "roaming" Internet access solution. The requirement for a roaming solution arises primarily because ISPs tend to specialize by geographic area, causing gaps in service coverage. The expansion of network infrastructure, network management and continuous upgrades to meet required reliability and performance standards all place tremendous capital and time burdens on ISPs. For these reason, many ISPs only locate Points of Presence (POPs) in a limited geographic area.

For the reasons set out above, the ability for ISPs to offer Internet roaming solutions, especially to business customers, is becoming increasingly important as many businesses utilize Internet-based communications to replace traditional remote access solutions for their telecommuters and mobile work forces. In order to provide Internet roaming solutions, some ISPs have begun to share network infrastructure to gain additional geographic reach. A user may then use a connection application to establish a network connection to a network connection point in a wired or wireless fashion.

For the purposes of this specification, the term "connection application" should be construed broadly as including, but not limited to, any device (both hardware and software) including functionality to authenticate data e.g., a peer-to-peer authentication arrangement, a dialer, a smart client, a browser, a supplicant, a smart card, a token card, a PDA connection application, a wireless connection, an embedded authentication client, an Ethernet connection, or the like.

SUMMARY OF THE INVENTION

In accordance with an aspect of the present invention, there is provided a method of communicating data via a network access point to a client device, the method including:

receiving an authentication request from the client device at the access point, the authentication request including identification credentials;

communicating the authentication request to an authentication server;

retrieving data associated with the authentication request; and communicating a reply message to the network access point, the reply message including the data and at least challenging the authentication request.

The authentication request may include a request identifier that identifies that the request is a faked authentication request. In one embodiment, the method includes communicating the reply message to a connection application on the client device, the reply message including one of an access challenge or an access rejection.

The data may be access point data that identifies a wireless local area network. The method may include communicating the authentication request from the authentication server to a transaction server that selectively identifies the data associated with the request and rejects the authentication request.

In one embodiment, the data includes data selected from at least one of data identifying a geographical location of the access point, time data, data that identifies the network that the access point forms part of, data identifying if a user is permitted to use the access point, data relating to the quality of service of the access point, data indicating a pending electronic message, and data indicating pending electronic mail.

The access point may provide network access at a wireless hotspot. The authentication request may be associated with a roaming access service provider.

Further in accordance with the invention, there is provided a method of obtaining data via a network access point with which a client device communicates, the method including:

communicating an authentication request from the client device at the network access point, the access request including user credentials and a request identifier to identify that the authentication request is a faked authentication request;

receiving a reply message from the network access point that at least challenges access to the network but includes the data; and processing the reply message to extract the data.

The method of may include generating a user interface that displays the data to a user of the client device.

The invention extends to a machine-readable medium embodying a sequence of instructions that, when executed by the machine, cause the machine to execute any of the methods described herein.

Still further in accordance with the invention, there is provided a computer system, which includes:

at least one network access point to receive an authentication request from a client device at the network access point, the authentication request including identification credentials; and at least one server to receive the authentication request from the network access point, wherein data associated with the authentication request is retrieved and communicated in a reply message to the network access point, the reply message at least challenging the authentication request.

The invention extends to a client device to obtain data via a network access point with which the client device communicates, the client device including:

a communication interface to communicate an authentication request from the client device to a the network access point, the access request including user credentials and an identifier to identify that the authentication request is a faked authentication request, and to receive a reply message from the network access point; and a processor to process the reply message to extract the data.

Other features and advantages of the present invention will be apparent from the drawings and detailed description that follow.

BRIEF DESCRIPTION OF THE DRAWINGS

The present invention is illustrated by way of example, and not intended to be limited by the figures of the accompanying drawings, in which.

DETAILED DESCRIPTION

A method and system communicating data via a network access or connection point is described. The access data may, for example, include location information that identifies the geographical location of the access point.

BACKGROUND

Network access devices typically encrypt a network user credential, such as a password, input by a network user to authorize access to a network by the user. In order to enhance security, the network access device may encrypt the network user credential with a public key, which is part of a public/private key pair, prior to transmitting the encrypted network password to a network decryption server. The network decryption server then decrypts the network user credential using the private key of the public/private key pair, where after the decrypted password is sent to an Authentication Authorization and Accounting (AAA) server for verification. If the password is positively verified at the AAA server, the AAA server sends an appropriate acknowledgment signal to the network access device indicating that the password has been properly verified or authenticated. Based on the acknowledgement signal, the network access device gains access to the Internet or some other resource. Once access is provided, updated data may then be downloaded to the network access device. For example, a connection application running on the network access device may have its phonebook updated with pricing data, connection quality data or the like that may have changed for one or more connection points (POPs) in the phonebook. The prior art, however, requires network access prior to the connection application obtaining any data about the access point.

Architecture

Figure 1:
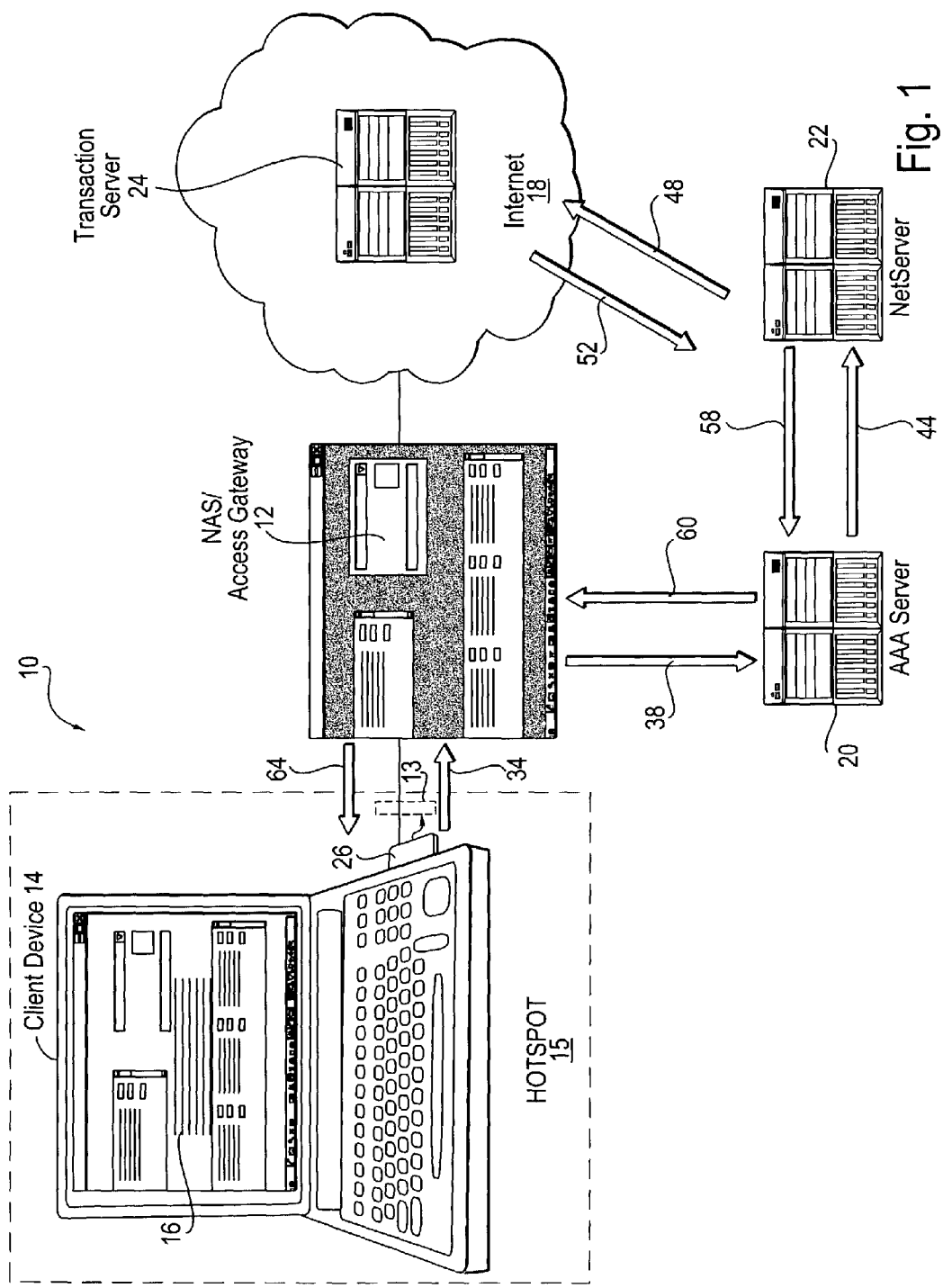
FIG. 1 is a schematic diagram of an exemplary embodiment of a system, in accordance with an aspect of the present invention, for determining access point data using a computer network.

Referring in particular to FIG. 1 of the drawings, reference numeral 10 generally indicates high-level architecture of a system, in accordance with one embodiment of the invention, for providing access point data associated with a access point of a network access server (NAS) or access gateway 12 which defines an access gateway to a client device 14. The client device 14 may be in the form of a mobile computing device such as laptop computer, PDA, or the like. The client device 14 includes a connection application 16 for establishing a connection to an external computer network. For example, the connection application 16 may, via the NAS 12, provide a mobile user access to the Internet 18. As described in more detail below, the system 10 further includes an Authentication, Authorization and Accounting (AAA) server 20, a network server 22 (NetServer), and a transaction server 24.

As mentioned above, the connection points such as the NAS 12 may be provided in a large number of diverse locations such as in coffee shops, hotels, in airport buildings and any other place that may or may not be open to the public. In one embodiment, wireless access may be provided by a NAS 12 located at each of these locations. It is however to be appreciated that the access point may be a wired or wireless access point.

Roaming Access Service Providers

Roaming access service providers allow global connectivity services that give mobile users access to the Internet from a plurality of locations often referred to as hotspots. Users or customers of a roaming access service provider utilize the client connection application 16 to connect to a computer network such as the Internet 18. In one embodiment, the user may specify an access type and location from an intuitive user interface, and select a local connection point. The connection application 16 may then transmit the user authentication request to the roaming access service provider's network and a connection to the Internet 18 may be established if the authentication request succeeds. The invention described herein however, enables determining the details of the access point prior to authenticating. In some embodiments, an access point 13 may be remotely located from the NAS 12. The client device 14 may then communicate with the NAS 12 via the access point 13 which may service a wireless hotspot 15.

The connection application 16 may include a list of access points that are within the roaming access service provider's network. The connection application 16 may also include detailed information about connection technology, pricing, and location details for each network access point. The network access point and its associated information may be grouped together in a directory interface, for example, a so-called phonebook. Users of the connection application 16 may utilize the directory information when deciding to establish a connection to the Internet 18. The connection application 16 may automatically update the directory information when connecting to the Internet 18.

The directory information in the connection application 16 typically contains static information that can only be updated after the client device 14 connects to the Internet 18. The static nature of the directory information may, however, be undesirable in certain circumstances.

For example, a roaming access service provider may support multiple pricing plans. When a contract is negotiated and a customer is provisioned, each customer may be assigned a pricing plan. The directory interface may include a price paid by the customer for utilizing the roaming access service provider's service. Static pricing information contained in the directory may be sufficient for most of the pricing plans, but for certain plans like pre-paid, daily fixed rate etc, it may necessary to show additional, dynamic pricing information to the user. Examples of such information include an amount left in user's account (e.g. in a pre-paid scenario), a number of minutes remaining in the day (e.g. in a daily fixed rate scenario), or the like.

The location information in the directory may include details of various geographical locations such as a site name, a site telephone phone number, a site address, a city name in which the site is located, a state or region name, a country code, Greenwich Meantime (GMT) offset, or the like. The connection application 16 may be able automatically to detect the presence of the wireless (e.g. 802.11a/802.11b or any Wi-Fi link) access points (using NDIS 5.1 (Network Driver Interface Specification) OIDS (Object Identifiers)) and associate them to the directory entry using a SSID (Service Set Identifier) used by the access point. The SSID is a 32 character unique identifier attached to the header of data packets sent over a Wireless Local Area Network (WLAN) that acts as an identifier when a mobile device attempts to connect to the basic network. The SSID differentiates one WLAN from another and thus may act as a connection point identifier. Thus, the SSID is also referred to as a Network Name because essentially it is a name that identifies a wireless network.

Unfortunately, network providers tend to use the same or a small set of SSIDs over their entire network even though the connection points in various hotspots are geographically dispersed. The use of the same SSID at geographically dispersed locations or different hotspots does not impair operation from a network provider's point of view, as the SSIDs are only required to be unique within the hotspot itself. Thus, different hotspots can have the same SSID and thus may not assist a user in identifying the particular geographical location of the actual hotspot in which he is located. As the SSID may not be unique to the hotspot, the connection application cannot associate these SSIDs to a unique directory entry (associated with a specific geographical location) because more than one entry in the directory may have a matching SSID.

Methodology

When a user with the mobile client device 14, that is equipped with a wireless interface 26, enters an area serviced by the NAS 12, typically known as a wireless hotspot, the wireless connection may establish a local wireless connection. The local connection may use 802.11a, 802.11b, or the like protocol. Such a connection merely establishes a connection between the client device 14 and the NAS 12 (or the access point 13 in another embodiment) and does not in itself provide access to any external network such as the Internet 18. In order to gain access to any external network, a user typically requires authentication, as described above. However, granting access to an external network may result in cost implications and, thus, the user may require an indication of costs that may arise prior to authentication. In order to do this, the connection application 16 may require access data on the connection point or NAS 12. As mentioned above, the SSID of the wireless access point or NAS 12 may not uniquely identify the NAS 12.

However, the connection application 16 may invoke a method 30 (see FIG. 2), in accordance with one aspect of the invention, of determining access point data associated with the access or connection point. As shown at block 32, the connection application 16 on the client device 14 sends an authentication request 34 (see FIG. 1) to the NAS 12. The authentication request 34 may include predetermined credentials associated with the customer or user of the client device 14. In one embodiment, in order to obtain data that may be relevant to a user of the client device 14, the client device fakes or feigns an authentication request that the access point communicates to an authentication server. The authentication server may then identify that the request is a fake request and send a reply message to the client device including data associated with the user (e.g., associated with a user credential), as described in more detail below. It is to be appreciated that the data communicated need not be limited to access point data but may include any data which is communicated to the client device 14 prior to granting the device 14 access to a network. The data may include, for example, data identifying a geographical location of the access point, time data, data that identifies the network that the access point forms part of, data identifying if a user is permitted to use the access point, data relating to the quality of service of the access point, data indicating a pending electronic message, and/or data indicating pending electronic mail.

The credential may be user identification data. For example, the connection application 16 may use RoamingServiceProvider/<ConnectionApplicationId>-
<Timestamp>@DiscoverLocation as an exemplary user name. The ConnectionApplicationId may define the user identification data (for example a connect dialer identification associated with the customer or the client when this data is available). The Timestamp may be the current system time and the DiscoverLocation may define a location or realm identifier to indicate that the client device 14 is requesting access point data (e.g. at a hotspot) and not requesting a connection to the external network.

The connection application 16 may build a password using the contents of a username. In some embodiments, the connection application 16 can also include information about the access point or NAS 12 determined through NDIS 5.1 OIDS in an authentication request. An example of such information includes the MAC address of the access point or NAS 12. The MAC address may optionally be included in the authentication request as the transaction server (discussed below) may utilize the MAC address of the access point to determine the geographical location of a hotspot using a database whereby access points are mapped to a location.

As mentioned above, the connection application 16 may transmit the authentication request 34 to the NAS 12 of the network service provider or the access gateway using an appropriate communication protocol. For example, the connection application 16 may support the following protocols:

PPP (Point-to-Point, which may be used for dial access points);

GIS (Generic Interface Specification, which may be used for wired and wireless broadband access points that may require HTTP or HTTPS based authentication); and 802.1x(Port based network access control, which is an emerging standard for Wired and Wireless Broadband Access points).

Figure 2:
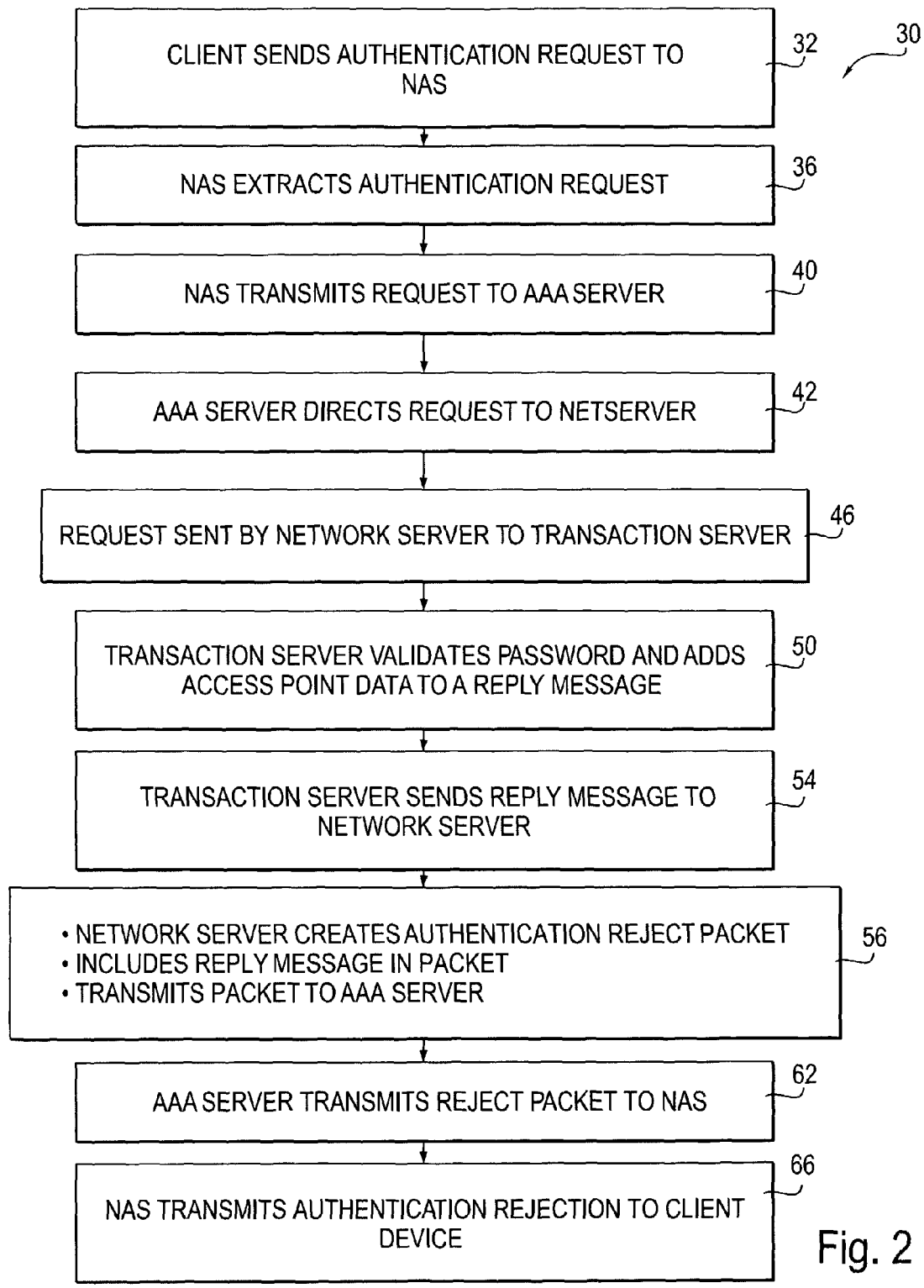
FIG. 2 shows a block diagram of a method, also in accordance with an aspect of the present invention, for determining access point data using a computer network.

The network provider's NAS or access gateway 12 may extract the authentication request (see block 36 in FIG. 2) and transmits the authentication request to the AAA server 20 as shown by arrow 38 in FIG. 1 (see also block 40 in FIG. 2). The AAA server 20 may be a local server and, in one embodiment, RADIUS protocol may be used for this communication.

The AAA server 20, of the particular network provider, may determine that the request should be routed to a network of the roaming access service provider. In particular, based on a roaming access service provider's prefix to the authentication request, the AAA server 20 may route the authentication request to the network server 22 of the roaming access service provider (see block 42 in FIG. 2 and arrow 44 in FIG. 1). The network server 22 may then receive the authentication request (e.g., sent using RADIUS protocol), establish an Secure Sockets Layer (SSL) tunnel to the transaction server 24, and transmit the request to the transaction server 24 via the proprietary protocol of the roaming access service provider (as shown block 46 and arrow 48).

Upon receipt of the request, the transaction server 24 identifies the authentication request, validates the user credentials (e.g. password) and adds the access point or location data (see block 50). The access point data may include geographical location information, pricing details, GMT time at the server and the GMT offset of the access location to a reply message that it generates. In addition, the transaction server rejects 24 the authentication request and transmits the reply message (see arrow 52 and block 54) to the network server 22. The authentication request is rejected by the transaction server 24 so that the NAS or access gateway 12 does not provide network access (e.g. Internet access) to the client device 14. The client device 14, as mentioned above, uses the method 30 to obtain access point data in this mode of operation and thus the request need not be approved.

As shown at block 56, upon receipt of the reply message, the network server 22, creates an authentication reject packet (e.g. a RADIUS packet), includes the reply message in the packet, and transmits the packet to the AAA server 20 of the network service provider (see block 56 and arrow 58). The network service provider's AAA server 20 may then proxy the authentication reject packet to the NAS or the access gateway 12 as shown by arrow 60 (see also block 62). The NAS or access gateway 12 then, as shown by arrow 64, transmits the authentication rejection to the connection application 16 via an appropriate protocol (see also block 66). The exemplary protocols identified above (PPP, GIS, 802.1x or the like) may carry the reply message from the RADIUS packet back to the connection application 16.

Figure 7:
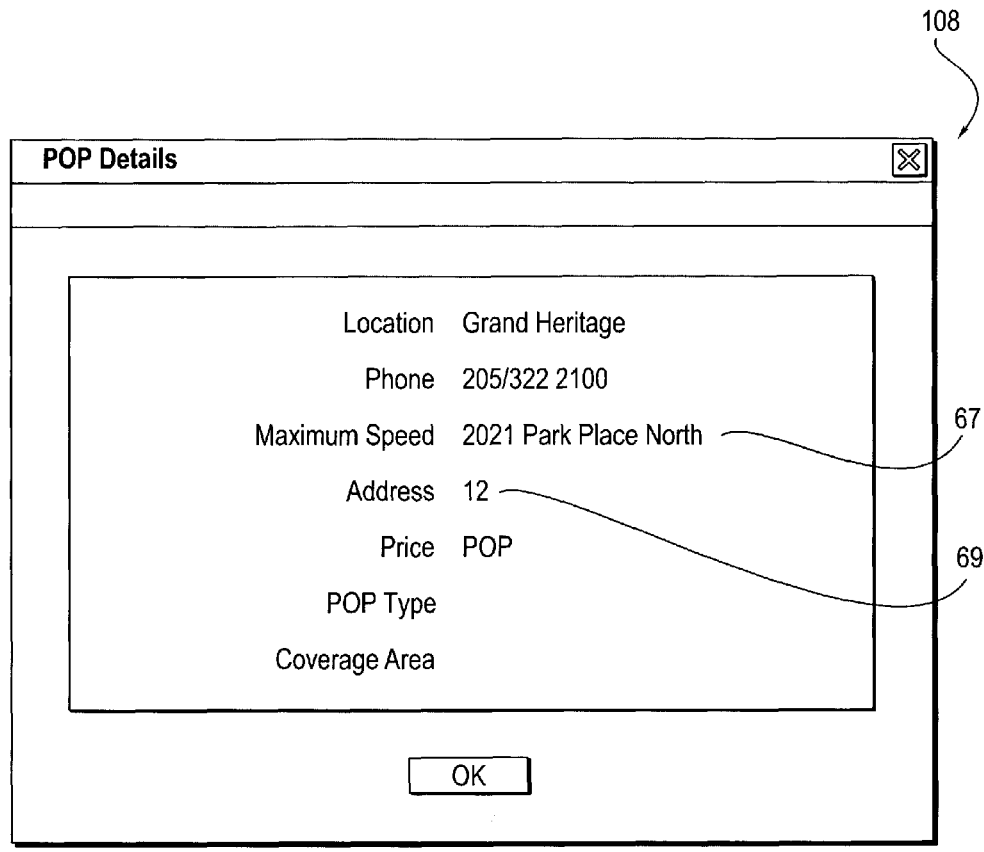

The connection application 16 may then parse the reply message to extract the access point data. For example, the connection application 16 may obtain information regarding the geographical location 67 (see FIG. 7) of the access point, pricing details 69 associated with use of the particular access point, GMT time at the server, the GMT offset of the access location, or the like.

Figure 3:
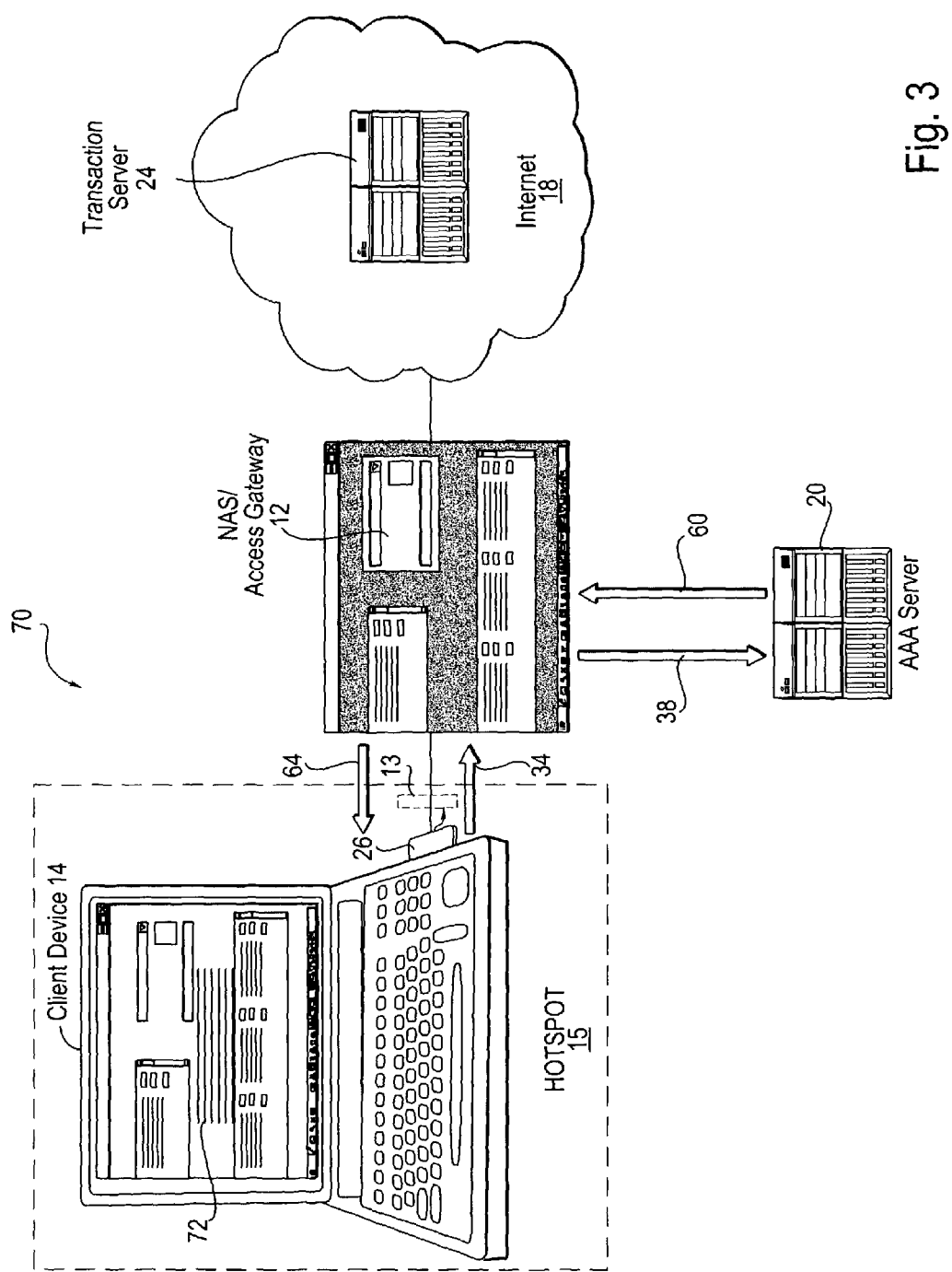
FIG. 3 is a schematic diagram of a further exemplary embodiment of a system, in accordance with an aspect of the present invention, for determining access point data using a computer network.
Figure 4:
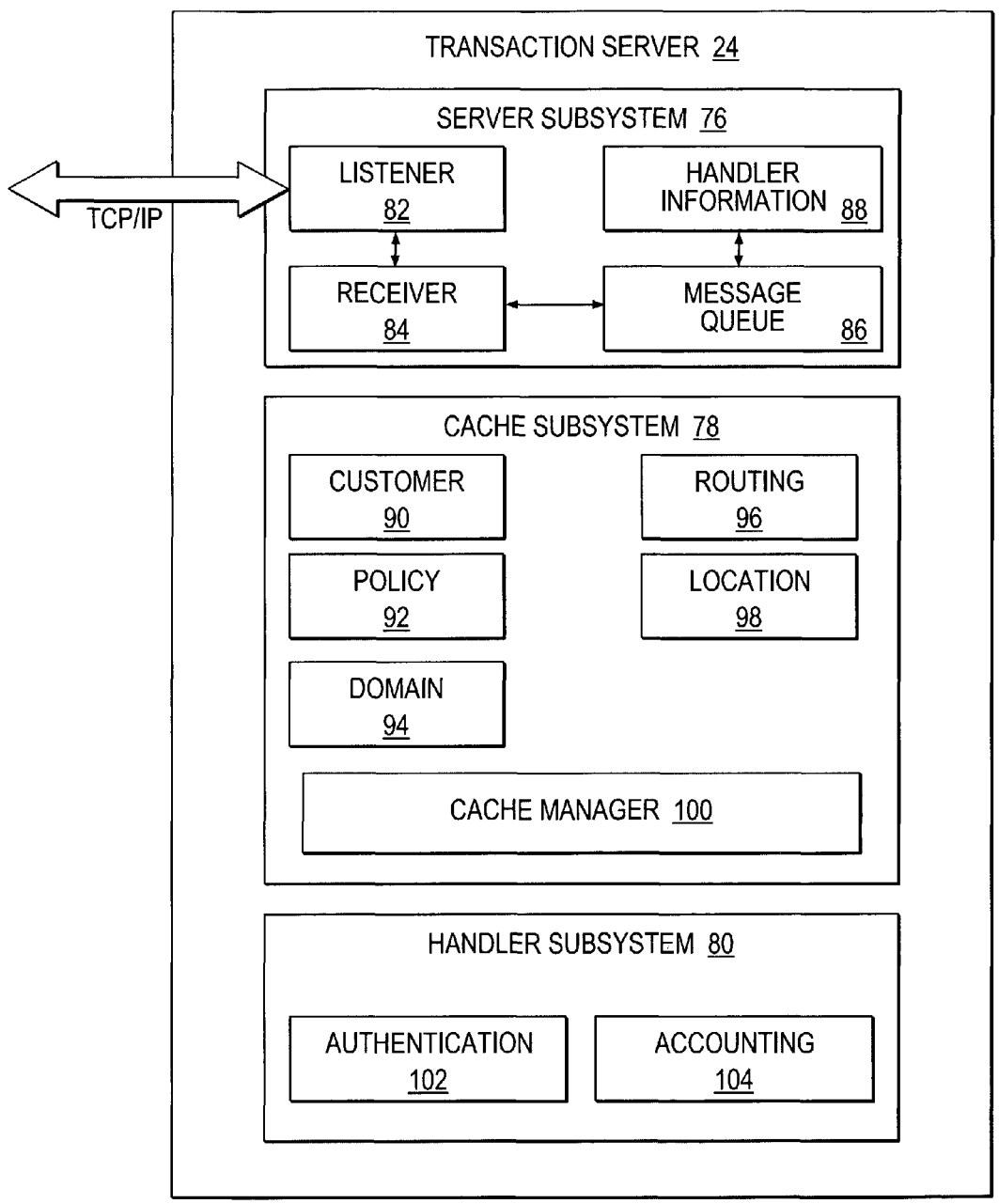
FIG. 4 is a schematic representation of a transaction server of the system of FIG. 1.

It will be appreciated that the implementation described above illustrates one exemplary embodiment of the invention. A further exemplary embodiment is shown in FIG. 3 which shows a high-level architecture of a system 70, in accordance with an aspect of the invention, for providing access point data associated with an access point of a network access server (NAS). The system 70 resembles the system 70 and, accordingly, like reference numerals have been used to indicate the same or similar features, unless otherwise indicated.

In the system 70, the connection application 16 is replaced by a generic connection client 72 that may not have been customized by a roaming access service provider. In this embodiment an authentication request received from the connection application client 72 is not transmitted to a network server or transaction server as in the case of the system 10.

In the system 70, the authentication request is communicated to the AAA server 20 in a similar fashion to that described above (see arrows 34 and 38 in FIG. 3, and blocks 32, 36 and 40 in FIG. 2). However, unlike the system 10 where the transaction server 24 terminates the request, in the system 70 the AAA server 20 terminates the request. The network provider, via its associated AAA server 20, then adds the access point data in a reply message when rejecting the authentication request. As discussed above, the reply message is then communicated back to the client device 14 (see arrows 60 and 64 in FIG. 3, and blocks 62 and 66 in FIG. 2).

In another alternative implementation, the transaction server 24 includes a challenge to the authentication request instead of rejecting the authentication request. The client device 14 receives the challenge and uses the method 30 to obtain access point data. The client device 14 can then send a subsequent fake authentication request to the transaction server 24. This scheme of the client transmitting an authentication request followed by the transaction server replying with an access challenge can be repeated multiple times. The exchange of messages may eventually end when the transaction server finally rejects the authentication request. This mechanism can be used for transmitting more information between the client and the transaction server 24.

Returning to the system 10, its various components are now discussed in more detail.

Transaction Server

In one embodiment, the transaction server 24 includes a server subsystem 76, a cache subsystem 78 and a handler subsystem 80. The server subsystem 76 may be responsible for receiving requests, maintaining a queue of requests, and managing handlers that process the requests from the network server 22. Major components of server subsystem 76 may include a listener component 82, a receiver component 84, a message queue component 86, and a handler component 88. The listener component 82 may receive the HTTPS requests from the network server 22 on a TCP/IP port and pass the requests to the receiver component 84.

The receiver component 84 determines the type of request from the network server 22. For example, the request may be a control request (e.g. shutdown/dump queue) or a data request (e.g. authentication/accounting). If a control request is received the appropriate control action is then initiated. If a data request is received, the receiver component 84 may then add the request to a message queue of the message queue component 86. Thereafter, the message queue component 86 may notify worker threads of the handler component 88 when a new request is added to a message queue. If a worker thread is available to process a request, it removes the request from the message queue and processes it immediately using an encapsulated handler. However, if a worker thread is not available to process a request, the request remains in the message queue waiting for one of the worker threads to finish its processing and process the pending request.

The cache subsystem 78 provides a set of entity objects for use by the handler subsystem 80. The cache subsystem 78 retrieves information stored in databases and caches it in memory. In one exemplary embodiment, the cache subsystem 78 includes a customer cache component 90, a policy cache component 92, a domain cache component 94, a routing cache component 96, and a location cache component 98. The cache components 90 to 98 retrieve information stored in the databases and cache it using a cache manager 100. The cache components 90 to 98 maintain the integrity of the caches by monitoring changes to the data in the database. When the cached data is invalidated by a change in the database, the cache components 90 to 98 refresh the data from the database.

In one embodiment, the handler subsystem 80 provides business logic needed to process the authentication and accounting messages and thus includes an authentication component 102 and an accounting component 104. The handler subsystem 80 may process the authentication and accounting requests received by a handler information thread. The details of the handler subsystem 80 are described below.

The authentication handler component 102 may process all authentication requests from the network server 22. The authentication handler component 102 may validate a source from which an authentication request is received, selectively authorize roaming access through a policy manager, resolves the route to a RoamServer 110 (discussed below with reference to FIG. 5), and transmit an authentication request to the RoamServer 110. The RoamServer 110 may then authenticate the request against the local AAA server 20, and transmits the authentication result back to the authentication handler component 102. The authentication handler component 102 may transmit the authentication result in the form of the reply message to the network server 22. In certain embodiments, the authentication handler component 102 uses the customer and routing cache components 90, 96 respectively to validate the request and to determine the route to the RoamServers 110.

If the authentication handler component 102 receives an authentication request to determine access point data (which may be called a "discover location request"), as described above, then the request may not be forwarded to the RoamServer 110. In one embodiment, a password included in the request is validated using an appropriate algorithm. Once the authentication handler component 102 determines that the request is a valid discover location request, it then identifies the location of the connection or access point hotspot 15 using the location cache component 98. In one embodiment, access point locations are represented in RADIUS requests in a variety of ways. The location cache component 98 may implement provider specific business rules to determine a location type for a given record.

During the resolution process to obtain the geographical location of the access point, if the location resolves to a known location identifier then the corresponding time zone information (time_zone_info) may be looked up, and the GMT offset of the location may be determined. The authentication handler may add location description data (location_description), location identification data (location_group_id), GMT time data of the transaction server 24 (gmt_time), and a GMT offset (gmt_offset) to the reply packet in the reply message attribute in the following exemplary format.

Location=San Francisco, Calif., US;LocationGroupId=1038; GMTTime=2002-08-15 23:12:34;GMTOffset=36000

The reply status indicating that the authentication has been rejected is then transmitted to the network server 22.

Connection Application

Figure 6:
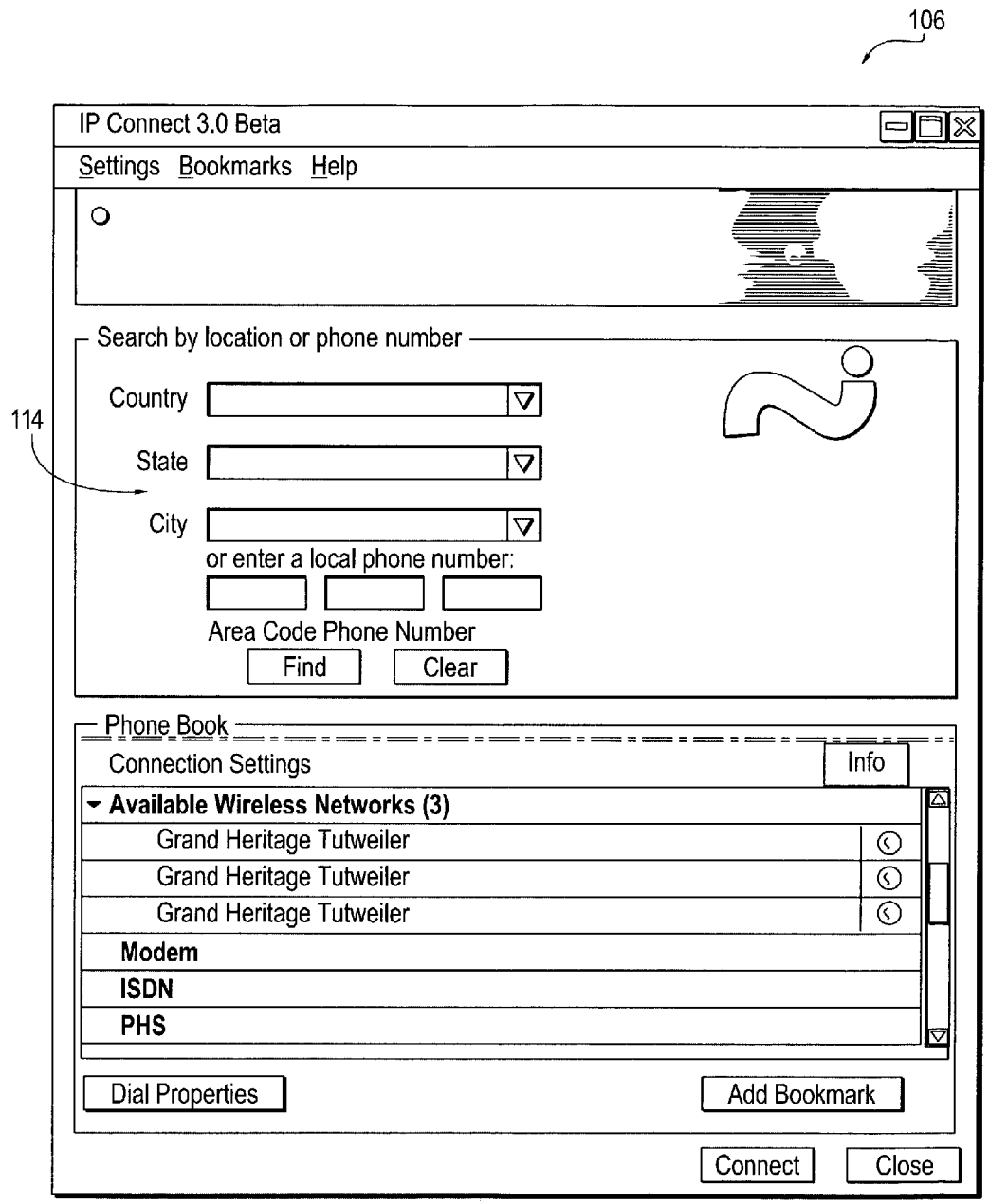
FIGS. 6 and 7 are schematic representations of graphic user interfaces generated by the method of FIG. 2.

The connection application 16 on the client device 14 includes a location interface 106 and access point data interface 108 (see FIGS. 6 and 7) and embedded Application Program Interface (eAPI) components. The eAPI components provide a core set of Component Object Model (COM) API calls. The core API calls are organized into independent COM interfaces including POP, connect, and location interfaces.

The access point data interface 108 (POP interface) may provide APIs for determining details of a directory of access points. These APIs may be used to filter and query access points from the directory. The location interface 106 (connect interface) may provide APIs for connecting to an access point. Using these APIs, the connection application 16 can establish an Internet connection to dial, wired and wireless access points.

The location interface 106 may provide APIs for determining the details 114 of the geographical or physical location of an access point. This information may be returned from the transaction server 24 as a result of a discover location authentication request that identifies that the user of the client device 14 desires access point data. The location group identifier present in the reply can be used to associate the location object to the access points object returned by the POP module.

Exemplary API Calls Used by the Connection Application

Exemplary API calls to support the connection application 16 in determining access point data, for example the geographical location of the access point, are set out below.

ConnectApp::DiscoverLocation

This API may initiate the location discovery process. In certain embodiments, this is an asynchronous call, which posts a message when the information is available to be retrieved with GetDiscoveredLocation( ). HRESULT DiscoverLocation([in] _HWND hWnd, [in] long nMessageID) Parameters, hWnd

[in] Window handle that will receive a message when location information is available.

nMessageID

[in] Message ID to send to identify that location information is available.

ppLocation

[out, retval] A reference to the IiPassLocation object.

Return Values

RASP_SUCCESS

Indicates that the API execution to the roaming access service provider (RASP) was successful.

RASP_IN_PROGRESS

Indicates that the discover location thread has already been started.

RASP_FAIL

Indicates that the discover location thread could not be created.

When the location discovery process is complete, the message nMessageID is posted to the window hWnd. In one exemplary embodiment, wParam has one of the following values:

| wParam | Description |
| --- | --- |
| 0 | Location information is now ready to be retrieved via GetDiscoveredLocation( ). |
| 1 | Location discovery thread is already in progress. |
| 2 | Cannot create location discovery thread. |
| 3 | Location discovery failed. Possible causes include: user is already authenticated reply message did not contain all required location parameters (location, locationgroupid, gmttime, gmtoffset) |

In one embodiment, the call creates a thread and returns immediately to the access point data requester. To discover the location, the thread may use a normal authentication request with the following special values:

Username: RoamingServiceProvider/<ConnectionApplicationId>-<Timestamp>@DiscoverLocation The ConnectionApplicationId may define the user identification data (for example a connect dialer identification associated with the customer or the client when this data is available).

The DiscoverLocation may define a realm identifier to indicate that the client device 14 is requesting access point data (e.g. at a hotspot) and not requesting a connection to the external network.

<Timestamp> may be the current time on the client (time_t), printed as an unsigned decimal number. In response to this request, the transaction server 24 may return the access reject message (that includes the location information connection point data) in a reply message in the following exemplary format:

<ReplyMessege>
Location=San Francisco, Calif., US;LocationGroupId=1038; GMTTime=2002-08-15 23:12:34;GMTOffset=36000
</ReplyMessege>

The following conditions are applicable to the exemplary reply message information:

GMT time format may be yyyy-mm-dd hh:mm:ss

GMT time offset format may be in seconds

The difference between the GMT time and the time on the client device 14 may be recorded. The difference may then be used in the future to produce output values for GetGMT-Time( ) and GetLocalTime( ).

RASPConnect::GetDiscoveredLocation

This API retrieves the location information that was obtained with DiscoverLocation, as described above.

HRESULT GetDiscoveredLocation([out, retval] IRASPLocation **ppLocation)

Parameters ppLocation

[out, retval] A reference to the IRASPLocation object.

Return Values

RASP_SUCCESS

Indicates that the API execution is successful.

RASP_FAIL

Indicates that discover location request failed.

IRASPLocation::GetLocation

Gets the location name.

HRESULT GetLocation([out, retval] BSTR*pLocation)

Parameters pLocation

[out, retval] Location name from the location object. On successful execution, the server may allocate the memory and it may be a client's responsibility to free this memory.

Return Values

RASP_SUCCESS

Indicates that the API execution is successful.

IRASPLocation::GetLocationGroupID

Gets the location group ID.

HRESULT GetLocationGroupID([out, retval] BSTR*pLocationGroupID)

Parameters pLocationID

[out, retval] Location group ID from the location object.

Return Values

RASP SUCCESS

Indicates that the API execution is successful.

IRASPLocation::GetGMTOffset

Gets the GMT offset from the location object.

HRESULT GetGMTOffset([out, retval] long*pnGmtOffset)

Parameters pnGmtOffset

[out, retval] GMT offset for this location. The offset value is in seconds.

Return Values

RASP_SUCCESS

Indicates that the API execution is successful.

IRASPLocation::GetGMTTime

Gets the current GMT time, as determined from the location object.

HRESULT GetGMTTime([out, retval] time_t*pnGMTTime)

Parameters pnGMTTime

[out, retval] GMT time, as computed from transaction server time_t may be the number of seconds since Jan. 1, 1970.

Return Values

RASP_SUCCESS

Indicates that the API execution is successful.

In certain embodiments, when a location object is created, the difference between GMT time and system time may be recorded. This difference may then be used in the future to calculate the GMT time based on the current system time.

RASPLocation::GetLocalTime

Gets the current local time, as determined from the location object.

HRESULT GetLocalTime([out, retval] time_t*pnLocalTime)

Parameters pnLocalTime

[out, retval] Local time, as computed from transaction server. time_t may be the number of seconds since Jan. 1, 1970.

Return Values

RASP_SUCCESS

Indicates that the API execution was successful.

In certain embodiments, this is a convenience function, which takes GetGMTTime, and applies the GetGMTOffset to it.

IRASPLocation::GetPOP

This API may get the POP object corresponding to this location object.

HRESULT GetPOP([out, retval] IiPassPOP*pPop)

Parameters pPop

[out, retval] The POP object associated with this location.

Return Values

RASP_SUCCESS

Indicates that the API execution was successful.

This method may use the location ID to retrieve the POP information from the directory. In certain embodiments, only POP fields that can be uniquely identified may include contain a value in the returned POP object. Other fields may be 0 or NULL.

In certain embodiments, GetPOP( ) API may perform the directory search to create the POP object when it is called, not when the InitRASPLocation object is created. Once created, the POP object may be cached for future calls to GetPOP( ) for this location object.

RASPPOP::GetPOPLocationGroupID

This API may get the location group ID of the access point.

HRESULT GetPOPLocationGroupID([out, retval] BSTR*pLocationGroupID)

Parameters pLocationGroupID

[out, retval] Returns the location group ID.

Return Values

RASP_SUCCESS

Indicates that the API execution was successful.

IRASPPOP::GetPOPTimeDayStarts

This API may get a local start time for a 24-hour billing cycle.

HRESULT GetPOPTimeDayStarts([out, retval] BSTR*pTimeDayStarts)

Parameters pTimeRateStarts

[out, retval] Returns the local time of the start of the billing cycle. The value returned will be in 24-hour format (i.e. 18:00:00).

Return Values

RASP_SUCCESS

Indicates that the API execution was successful.

Figure 5:
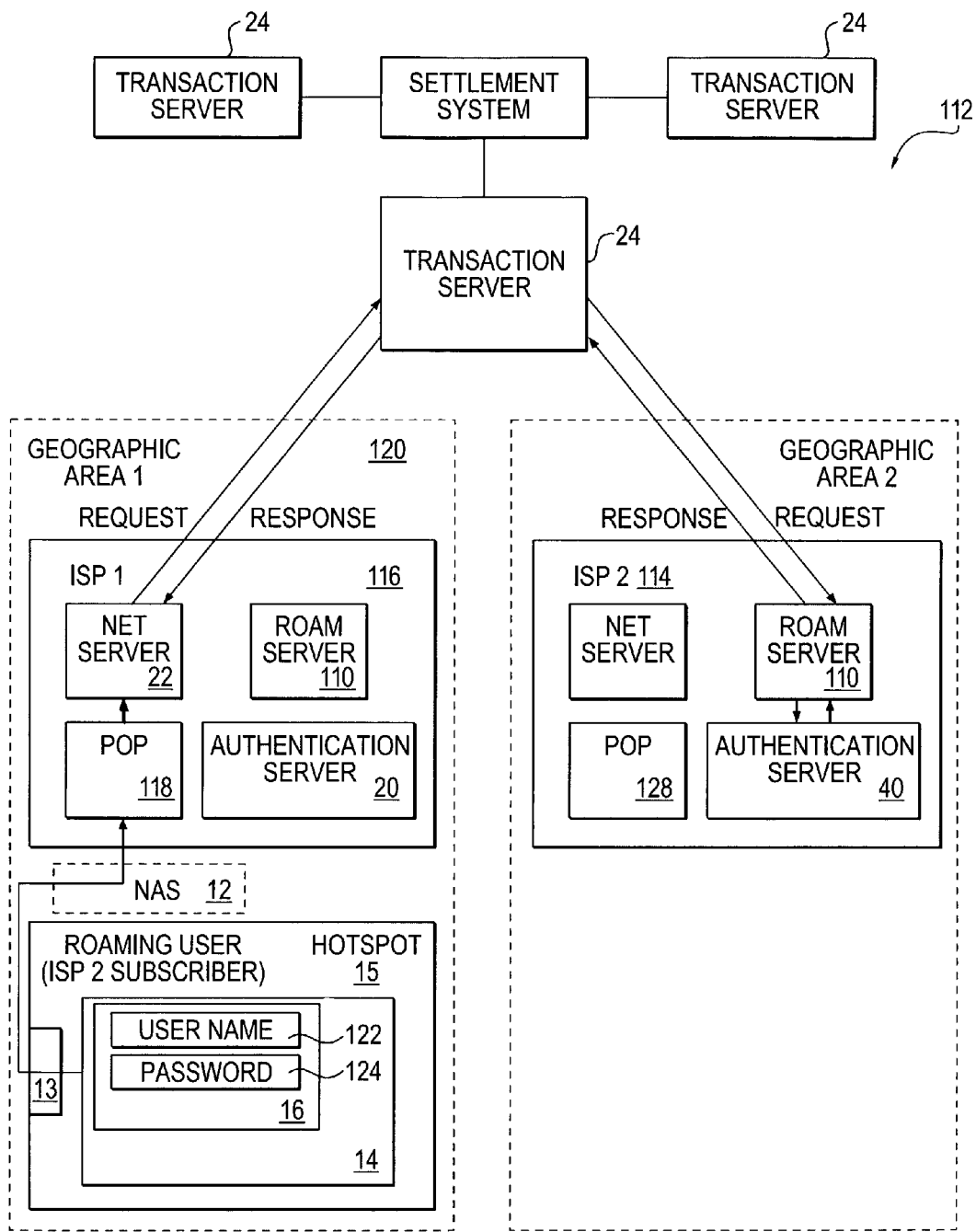
FIG. 5 is a schematic representation of an exemplary roaming access service provider network.

Referring in particular to FIG. 5, reference numeral 112 generally indicates an example of the invention applied in a roaming access system that provides roaming Internet access in a relatively secure manner. When a roaming user, shown to be a subscriber to a "home" ISP 114, connects to a remote ISP 116 that provides a local POP 118 within a specific geographic area 120 (which may service a hotspot 15), the roaming user inputs the same user name 122 and password 124

(authentication data or user credentials) used when connecting via a POP 128 of the "home" ISP 114.

As mentioned above, the hotspot 15 may be any location (e.g., cafe, hotel, airport, or the like) where a network access point is provided to connect to a computer network. In the exemplary embodiment shown in FIG. 5, is within the hotspot 15, the method described herein may be used to identify the particular hotspot 15. Once the hotspot 15 has been identified, the connection application 16 may provide the user with, for example, details regarding use of the hotspot 15 in accordance with a contract entered into with the home ISP 114. For example, a directory interface may include a price paid by the user for utilizing the roaming access service provider's service at the hotspot 15. Further, once the hotspot 15 has been identified, dynamic pricing information relating to pre-paid access, daily fixed rate access, or the like may be presented to the user. Examples of such information include an amount left in user's account (e.g. in pre-paid scenario), a number of minutes remaining in the day (e.g. in daily fixed rate scenario) or the like. It is however to be appreciated that, in one embodiment of the invention, the method and system can communicated any data to the user without actually authenticating the user.

Figure 8:
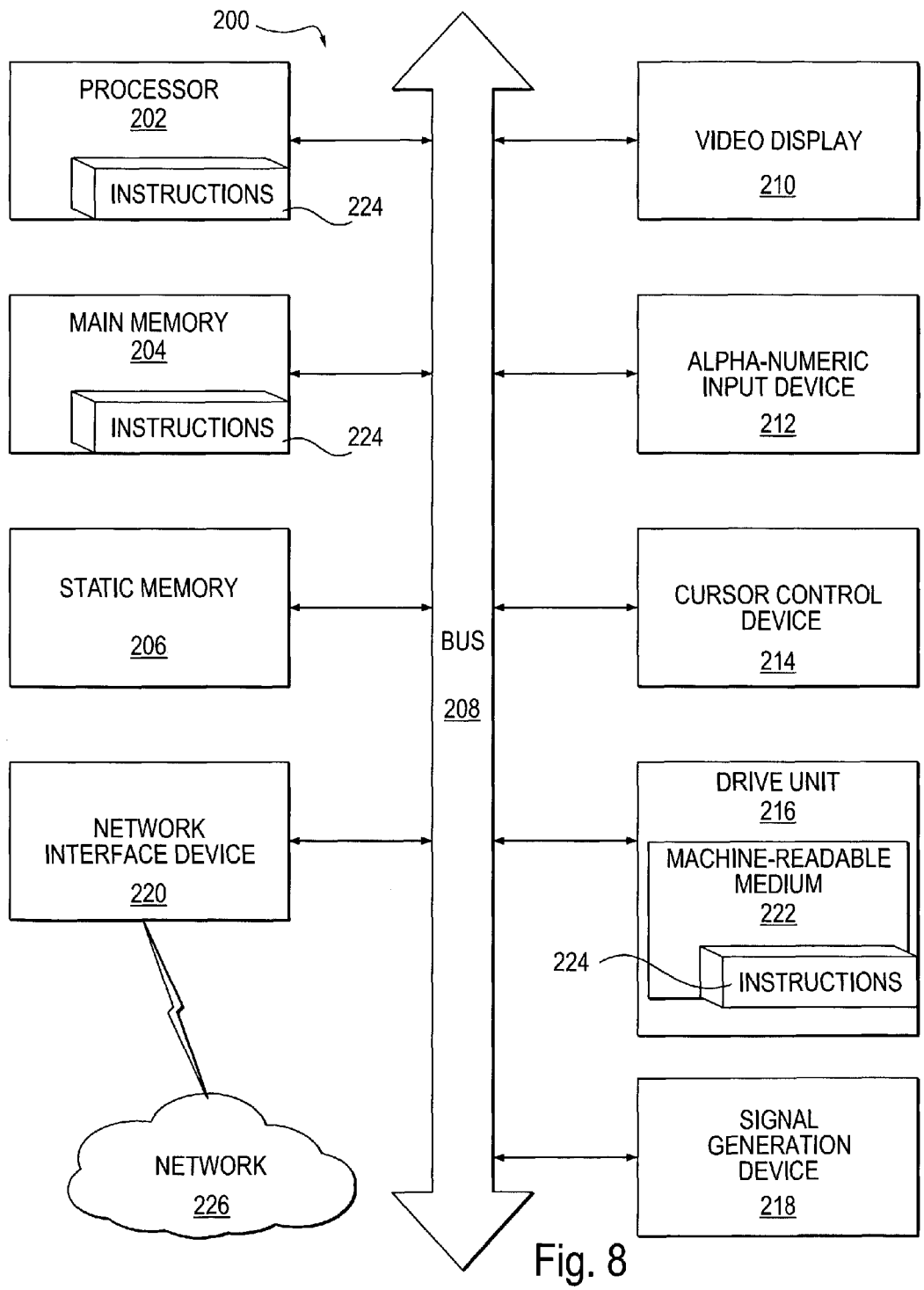
FIG. 8 is a schematic diagram of a computer system, which may be configured as a client device or configured to function as any one of the servers herein described.

FIG. 8 shows a diagrammatic representation of machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines, in a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU) a graphics processing unit (GPU) or both), main memory 204 and static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220. The disk drive unit 216 includes a machine-readable medium 222 on which is stored one or more sets of instructions 224 (e.g., software) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220. While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, and optical and magnetic media.

Thus, a method of, and system for, obtaining and providing data prior to authentication is described. In the foregoing detailed description, the invention has been described with reference to specific exemplary embodiments thereof. It will, however, be evident that various modifications and changes may be made thereto without departing from the broader scope and spirit of the invention as set forth in the appended claims. The specification and drawings are, accordingly, to be regarded in an illustrative sense rather than a restrictive sense.

What is claimed is:

1. A method for determining information about an access point without successfully authenticating with a network, the method comprising:

sending, from a connection application on a client device to an access point, an authentication request including identification credentials indicating a reply to the authentication request is to include information about the access point, wherein the authentication request is destined for a transaction server and the reply originates from the transaction server;

receiving, at the client device from the access point, the reply in response to the authentication request, wherein the reply rejects the authentication request and includes the information about the access point; and updating a directory on the client device based, at least in part, on the information about the access point.

2. The method of claim 1, further comprising generating a user interface that displays at least one of the information about the access point and the directory after the updating.

3. The method of claim 1, wherein the information about the access point includes at least one of data identifying a geographical location of the network access point, data relating to a quality of service attribute of the network access point, and data indicating pending electronic mail.

4. The method of claim 1, wherein said sending the authentication request from a connection application on the client device comprises sending the authentication request over a wireless communication link.

5. The method of claim 1, wherein the directory comprises a plurality of directory entries, wherein the plurality of entries correspond to a plurality of access points and data associated with the plurality of access points.

6. The method of claim 1, wherein the information about the access point includes cost data indicating cost associated with accessing one or more networks.

7. A method for providing information about an access point without successfully authenticating a client device, the method comprising:

receiving, at an authentication server, an authentication request, the authentication request including identification credentials, wherein the authentication request indicates that a reply message in response to the authentication request is to include data for updating a directory on a client device, wherein the data includes location information about the access point;

after receiving the authentication request, determining the data for updating the directory on the client device, wherein the determining is based, at least in part, on the identification credentials; and generating, at the authentication server, the reply message, wherein the reply message is in response to the authentication request, wherein the reply message includes the data for updating the directory; and transmitting the reply message to the client device.

8. The method of claim 7, wherein the data for updating the directory further includes at least one of data relating to a quality of service attribute of the network access point, and data indicating pending electronic mail.

9. The method of claim 7, wherein the directory comprises a plurality of directory entries, wherein one of the plurality of entries corresponds to the access point.

10. The method of claim 9, wherein the data for updating the directory further includes cost data indicating costs associated with connecting to one or more networks.

* * * * *